United States Patent Office 3,212,714
Patented Oct. 19, 1965

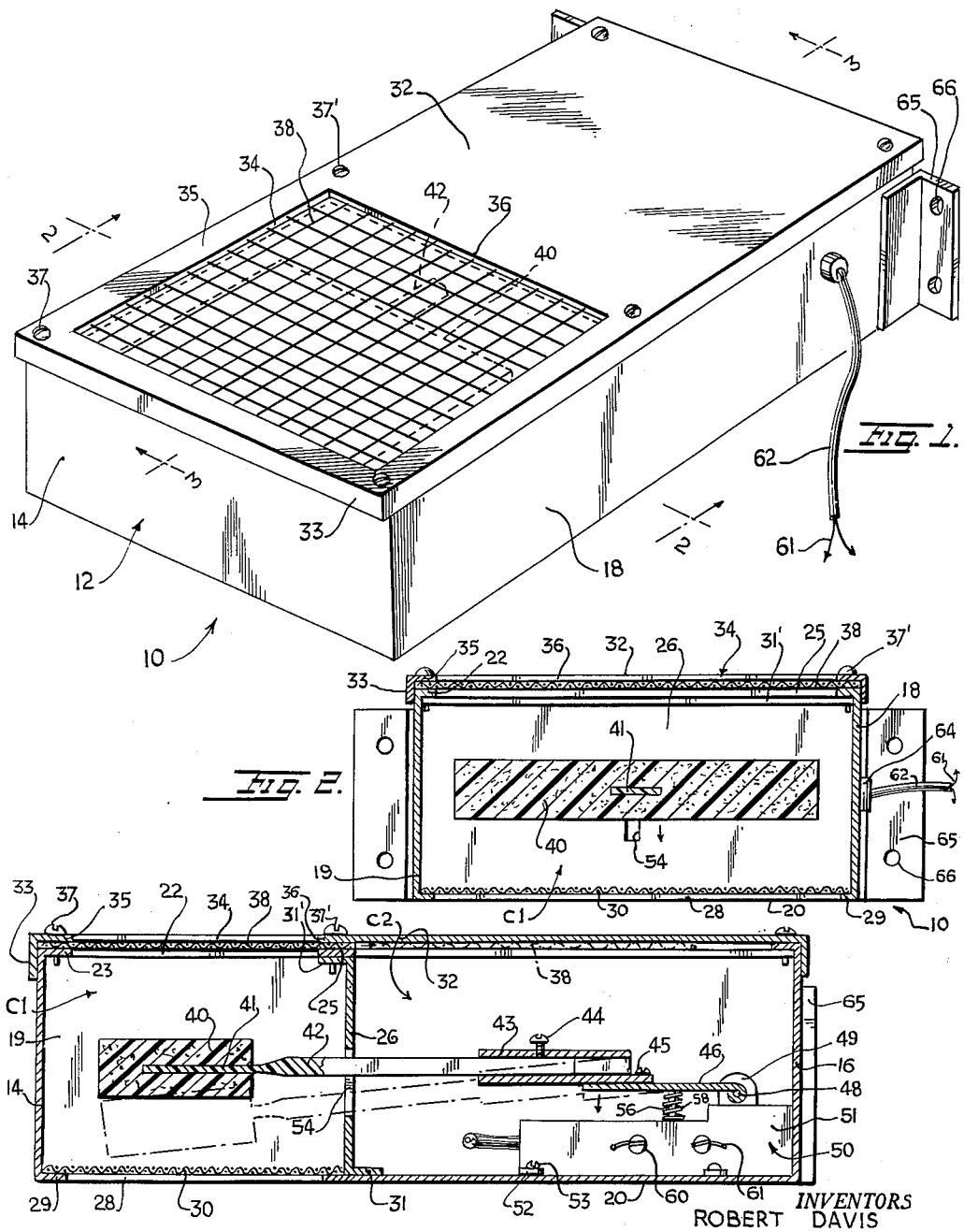

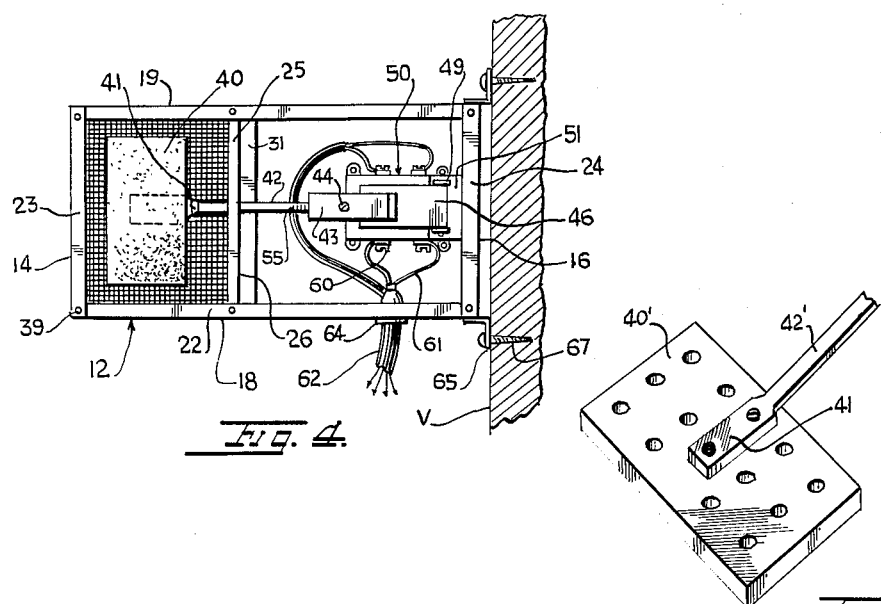
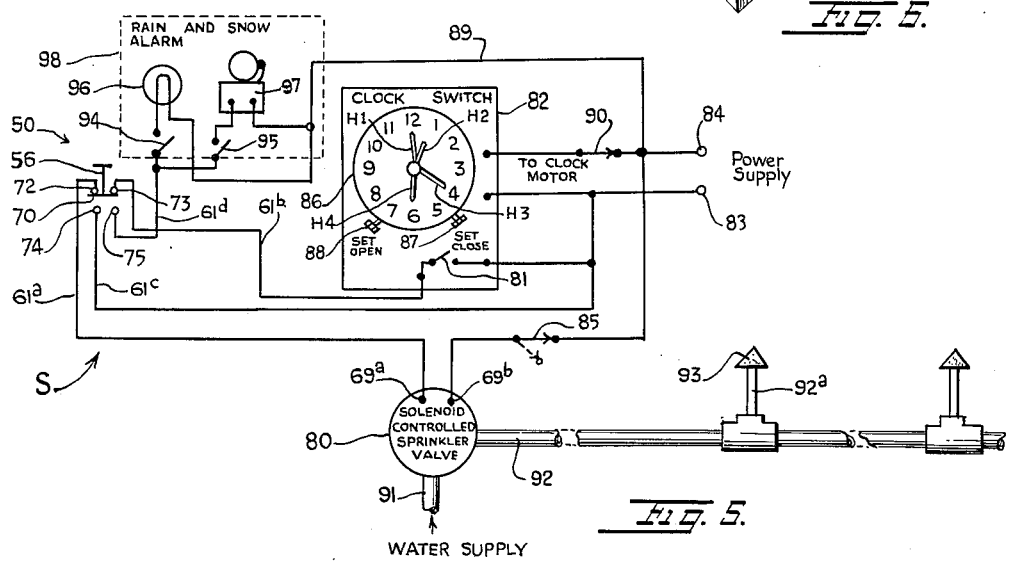

3,212,714
WEATHER SWITCH FOR AUTOMATIC CLOCK SPRINKLER SYSTEM
Robert Davis, 2231 Brookhaven Ave., and Edward Orman, 20—04 Seagirt Blvd., both of Far Rockaway, N.Y.
Filed Jan. 6, 1964, Ser. No. 335,890
11 Claims. (Cl. 239—63)

This invention relates to a switching apparatus operable in response to weather conditions to control a sprinkler system, and including signaling or alarm devices for indicating the operating state of the apparatus.

According to the invention there is provided an apparatus including a switch box which can be mounted in the open air on a support exposed to the weather. Inside the box is a porous body supported in a balanced position by spring means in a push-button type of microswitch. The porous body is exposed to rain and snow through an opening in the top of the box. The microswitch is connected in circuit with a clock switch and solenoid operated water sprinkler valve. The clock switch normally closes at predetermined intervals to activate the solenoid valve and lawn sprinklers controlled by the valve. If a predetermined amount of rain falls on the lawn prior to the time sprinklers are actuated, the heavy, wet porous body will operate the microswitch to open the power supply circuit of the solenoid valve and prevent operation of the sprinklers during the usual predetermined operating interval. The porous body is arranged so that water can evaporate therefrom and can also drain off, in a manner simulating the characteristics of wet sod in a lawn. The microswitch may also be connected in circuit with audible and visual alarms which are actuated when the microswitch is operated. The apparatus may be used as a switching and alarm system to indicate certain snow conditions during the winter season when the lawn sprinklers will not normally be operated.

It is therefore a principal object of the invention to provide an apparatus including a switch box which can be mounted outdoors in a position exposed to the weather, with a porous body movably mounted in the box and responsive to weather conditions for operating a push-button type of switch.

Another object is to provide an apparatus as described, wherein the switch is connected in circuit with alarm devices for indicating when the switch is operated.

A further object is to provide an apparatus as described wherein the switch is further connected in circuit with a water sprinkler control system, for activating and deactivating the system in response to weather conditions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a switch box according to the invention.

FIG. 2 and FIG. 3 are sectional views taken on lines 2—2 and 3—3, respectively, of FIG. 1.

FIG. 4 is a top plan view on a reduced scale of the switch box with cover removed.

FIG. 5 is a diagram of an electric circuit and components of a system embodying the invention.

FIG. 6 is a perspective view of a modified form of actuating bar used for snow indication.

Referring to FIGS. 1–4, there is shown a switch box 10. This box has a rectangular base 12 with front wall 14, rear wall 16, side walls 18, 19 and bottom wall 20. At the open top of the base 12 are lateral overhanging narrow flanges 22 extending inwardly from side walls 18, 19. End flanges 23, 24 extend inwardly from the front and rear walls 14, 16. A crossbar or plate 25 extends across the top of the base between the flanges 22. A partition plate 26 is vertically disposed in the box and extends across the box dividing it into two compartments C1 and C2. A rectangular opening 28 is provided in the bottom wall 20 at the bottom of compartment C1. Around opening 28 are narrow flanges 29 in compartment C1 on which may be placed a wire mesh screen 30. The partition plate 26 may have a bottom flange 31 secured to bottom wall 20 in compartment C2 and a top flange 31' secured to the underside of crossbar 25 in compartment C1.

The box is provided with a removable rectangular cover 32. The cover 32 has a depending flange 33 extending all around the cover. In the top of the cover is a rectangular opening 34. Marginal flanges 35 which define front and sides of opening 34 overlay flanges 22 and 23. The rear edge 36 of openings 34 overlays crossbar 25. A wire mesh screen 38 is disposed on flanges 22, 23 and crossbar 25, underneath marginal flanges 35 and edge 36 of openings 34 to keep foreign objects from falling into the box. This screen can be moved rearwardly to a rear position, indicated by dotted lines in FIG. 3, away from compartment C1 and over compartment C2, to clear opening 34. Screws 37 may be provided at the four corners of the cover box to secure the cover to the base by engaging in threaded corner holes 39, shown in FIG. 4. Further screws 37' may be provided at the opposite lateral edges of the cover over the ends of crossbar 25. Front screws 37 and intermediate screws 37' may extend through corners of the screen 38 to lock this screen in place over compartment C1. By removing these screws the screen is released and can be moved rearwardly on flanges 22 under the rear of cover 32, and the removed screws can then be replaced.

Inside of compartment C1 is a rectangular porous body preferably in the form of a synthetic rubber or plastic sponge 40. The sponge should have such a porous cellular consistency as to simulate the porous characteristics of lawn sod. Secured in the sponge by a suitable adhesive or otherwise, is the flat blade end 41 of a bar 42. The rear end of bar 42 is telescopically and adjustably engaged in a sleeve 43 by a set screw 44. The sleeve is secured at its rear end by screws 45 to a lever 46 of a push-button type of microswitch 50. The lever 46 is pivotally mounted on a pintle 48 carried by brackets 49 on the rectangular body 51 of the switch. The switch body has brackets 52 receiving screws 53 which secure the switch body in a position extending forwardly of rear wall 16 on bottom wall 20 in compartment C2.

The bar 42 extends through a vertical slot 54 formed in partition 26. The bar 42 is movable in a vertical plane and is prevented from lateral displacement by the vertical edges of slot 54. On bar 42 are graduations 55 which indicate the extent to which bar 42 projects into sleeve 43 and serve as a guide in fixing the distance of the sponge 40 from the fulcrum of the lever arm including bar 42, sleeve 43 and lever 46.

The lever 46 rests on a vertical operating finger or button 56 of switch 50. A compressible coil spring 58 supports the lever in the elevated position shown in FIG. 3. Screw terminals 60 are provided for wires 61 connected to the switch. The wires are formed into a cable 62 which passes through a grommet 64 and out of side wall 18. The cable terminates in a circuit to be described in connection with FIG. 5.

On the rear end of the base of the box are laterally extending flanges or angle brackets 65 provided with holes 66 for receiving screws 67 to mount the box 10 in a horizontal position on a vertical support V, such as the outside wall of a building, a post set in the ground, a fence or other support located in an exposed out-of-doors position.

Referring to FIG. 5, there is shown a system S in which switch 50 has button 56 connected to a shorting bar 70. The switch is a single-pole, two-position, push-button switch. Shorting bar 70 in its normal elevated position connects fixed contacts 72, 73. In its lower, depressed position, bar 70 connects fixed contacts 74, 75.

Contact 72 is connected via wire 61$^a$ to one terminal 69$^a$ of a solenoid in a solenoid controlled water sprinkler valve 80. Contact 73 is connected via wire 61$^b$ to a single pole-single throw switch 81 in a clock controlled switch assembly 82. Switch 81 is connected to one terminal 83 of a suitable electric power supply. The other terminal 84 of the power supply is connected to terminal 69$^b$ of the solenoid in valve 80 via a manually controllable switch 85. Terminals 83 and 84 of the power supply are connected to the motor of the clock 86. The clock has minute and hour hands H1, H2. In addition, the clock has a hand 83 controlled by a setting knob 87 for determining when the switch 81 will be closed in the clock switch. Hand H4 can be set by knob 88 for determining when switch 81 will be opened. Thus the setting of hands H3 and H4 determines the time interval during which switch 81 is closed.

Contact 74 of switch 50 is connected via wire 61$^c$ to power supply terminal 83. Contact 75 is connected via wire 61$^d$ to switches 94, 95 connected in parallel. These switches are manually operable and are respectively connected in series circuit with a signal lamp 96 and a bell or buzzer 97 in an alarm box 98. This alarm box can be located inside the house on the outside of which box 10 may be mounted. The return circuit wire 89 of the lamp and bell is connected to power supply terminal 84. A manually operable switch 90 is provided in series with the motor of the clock switch 82.

A water supply pipe 91 is connected to the valve 80. This valve controls the supply of water to outlet pipe 92. Water sprinklers 93 are fed with water via pipe 92 and branch pipes 92$^a$. The sprinklers can be arranged in a permanently installed lawn sprinkling system. Alternatively, the sprinklers may be portable units provided with temporary connections to pipe 92.

In operation of the system, during the normal spring, summer and fall lawn watering seasons, the water sprinklers 93 will be used. The box 10 may be permanently attached to its support V and left in place all year round. The porous sponge 40 will be exposed to rainfall through the screen 38. The position of the sponge is adjusted by moving bar 42 slidably in sleeve 43 and then tightening screw 44. During a light rain the sponge will take up very little water, insufficient to throw switch 50 to its second position when contacts 74, 75 are closed by bar 70. During a heavy rain, the sponge will take up sufficient water to be weighted down and contacts 72, 73 will be opened while contacts 74, 75 will be closed. When contacts 72, 73 open they open the power supply circuit of valve 80. During the time interval when the switch 81 is closed the valve 80 will be held inactive and closed due to the open power supply circuit for the solenoid in this valve. If either or both switches 94, 95 are closed, the lamp 96 and/or the bell 97 will sound to indicate that the sprinkler system is being held deactivated by the weighted sponge 40. Opening either switch cuts off the visual or audible alarm.

After sufficient water drains out of sponge 40 and through opening 28 in the bottom of the box 10 and also evaporates out of the sponge, the sponge will be lightened and the spring 58 will raise the sponge via the lever 46. The contacts 72, 73 will be closed again and the contacts 74, 75 in the alarm circuit will be opened.

During the winter season, the switches 85 and 90 can be opened to deactivate the water sprinkler supply and control system. The screen 38 can be retracted into compartment C2. The apparatus may then serve as a snow alarm device. When sufficient snow falls on the exposed sponge 40 through the opening 34 in the top of the box 10, the weighted sponge will be lowered to close contacts 74, 75 and actuate either or both alarm devices 96, 97 depending on which one of switches 94, 95 is closed.

In FIG. 6 the actuating arm 42' is shown with a non-corrosive, non-absorbent, perforated plate 40' which may be substituted in place of the sponge 40, to be used especially for snow indication. The apertures in plate 40' will permit moisture or water to pass therethrough but will retain snow to settle thereon.

In many automatic lawn sprinkling systems the watering period is set during early morning, early evening or night hours. If rain has fallen during the preceding hours, the lawn will be excessively watered. This is most objectionable. Generally during these hours no one is available to turn off the sprinkling system. Also it is difficult to determine whether the rain which has fallen is or is not equivalent to a thorough lawn watering. The present apparatus solves these difficulties and makes wholly automatic the activation and deactivation of the lawn sprinkling system. During a period of high humidity a particular rainfall may not evaporate quickly so that subsequent lawn watering will not be required. During a period of low humidity, the same quantity of rainfall may evaporate to require further lawn watering. The present apparatus thus takes into account prevailing and changing humidity conditions, since the density, porosity, and other characteristics of the sponge will be such as to closely simulate the type of sod or soil whose watering the apparatus monitors and controls.

The use of the apparatus in a snow alarm system increases the utility of the apparatus so that it provides year-round service. The apparatus can be made up in different sizes with different types and styles of switch boxes, mounting brackets, etc.

It is to be understood that this device may be arranged on a horizontal plane or at any desired inclination.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A control apparatus for a lawn sprinkling system including a solenoid-controlled water valve in a power supply circuit with a clock-controlled switch and an electric power source, comprising in combination:

a box having a rectangular base with open top and a removable cover on said base;

a partition in said box dividing the same into two compartments;

a sponge simulating in density and porosity equivalent characteristics of said lawn;

a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;

a push-button switch in the other compartment, said push-button switch having normally closed contacts for connection in said circuit;

a lever pivotally mounted on said push-button switch for opening said contacts;

lever means connecting said bar to said lever, said partition having a vertical slot therein, said bar passing through said slot and constrained against lateral movement by edges of said slot;

and spring means yieldably supporting said lever in an elevated position so that said contacts are closed, whereby said sponge is lowered when it is wet by sufficient rain falling thereon through the opening in the cover to open said contacts and thereby open said power supply circuit.

2. A control apparatus for a lawn sprinkling system including a solenoid-controlled water valve in a power supply circuit with a clock-controlled switch and an electric power source, comprising in combination:

a box having a rectangular base with open top and a removable cover on said base;

a partition in said box dividing the same into two compartments;

a sponge simulating in density and porosity equivalent characteristics of said lawn;

a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;

a removable screen mounted on the base over said one compartment to prevent foreign objects from falling in the box;

means on said box for mounting the same in a horizontal position so that the sponge is exposed to said rainfall;

a push-button switch in the other compartment, said push-button switch having normally closed contacts for connection in said circuit;

a lever pivotally mounted on said push-button switch for opening said contacts;

lever means connecting said bar to said lever, said partition having a vertical slot therein, said bar passing through said slot and constrained against lateral movement by edges of said slot;

and spring means yieldably supporting said lever in an elevated position so that said contacts are closed, whereby said sponge is lowered when it is wet by sufficient rain falling thereon through the opening in the cover to open said contacts and thereby open said power supply circuit.

3. A control apparatus for a lawn sprinkling system including a solenoid-controlled water valve in a power supply circuit with a clock-controlled switch and an electric power source, comprising in combination:

a porous body;

a push-button switch having normally closed contacts for connection in said circuit;

a lever pivotally mounted for opening the contacts of said push-button switch and normally supported so that the contacts are closed;

lever means connecting said porous body and lever;

and means for supporting said porous body in and out-of-doors position exposed to rainfall, whereby said porous body is depressed when sufficient rain falls thereon to open said contacts for deactivating said power supply circuit;

said push-button switch having normally open other contacts for connection to an alarm device, said other contacts being arranged to be closed when the first-named contacts are open and vice versa, whereby said alarm device will be actuated when said porous body is depressed to open the first-named contacts and close said other contacts.

4. A control apparatus for a lawn sprinkling system including a solenoid-controlled water value in a power supply circuit with a clock-controlled switch and an electric power source, comprising in combination:

a box having a rectangular base with open top and a removable cover on said base;

a partition in said box dividing the same into two compartments;

a sponge simulating in density and porosity equivalent characteristics of said lawn;

a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;

a push-button switch in the other compartment, said push-button switch having normally closed contacts for connection in said circuit;

a lever pivotally mounted on said push-button switch for opening said contacts;

lever means connecting said bar to said lever, said partition having a vertical slot theren, said bar passing through said slot and constrained against lateral movement by edges of said slot;

and spring means yieldably supporting said lever in an elevated position so that said contacts are closed, whereby said sponge is lowered when it is wet by sufficient rain falling thereon through the opening in the cover to open said contacts and thereby open said power supply circuit;

said push-button switch having normally open other contacts for connection to an alarm device, said other contacts being arranged to be closed when the first-named contacts are open and vice versa, whereby said alarm device will actuated when said porous body is depressed to open the first-named contacts and close said other contacts.

5. A control apparatus for a lawn sprinkling system including a solenoid-controlled water valve in a power supply circuit with a clock-controlled switch and an electric power source, comprising in combination:

a box having a rectangular base with open top and a removable cover on said base;

a partition in said box dividing the same into two compartments;

a sponge simulating in density and porosity equivalent characteristics of said lawn;

a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;

a removable screen mounted on the base over said one compartment to prevent foreign objects from falling in the box;

means on said box for mounting the same in a horizontal position so that the sponge is exposed to said rainfall;

a push-button switch in the other compartment, said push-button switch having normally closed contacts for connection in said circuit;

a lever pivotally mounted on said push-button switch for opening said contacts;

lever means connecting said bar to said lever, said partition having a vertical slot therein, said bar passing through said slot and constrained against lateral movement by edges of said slot;

and spring means yieldably supporting said lever in an elevated position so that said contacts are closed, whereby said sponge is lowered when it is wet by sufficient rain falling thereon through the opening in the cover to open said contacts and thereby open said power supply circuit;

said push-button switch having normally open other contacts for connection to an alarm device; said other contacts being arranged to be closed when the first-named contacts are open and vice versa, whereby said alarm device will be actuated when said porous body is depressed to open the first-named contacts and close said other contacts.

6. A control apparatus for a lawn sprinkling system including a solenoid-controlled water valve in a power supply circuit with a clock-controlled switch and an electric power source, comprising in combination:
- a porous body;
- a push-button switch having normally closed contacts for connection in said circuit;
- a lever pivotally mounted for opening the contacts of said push-button switch and normally supported so that the contacts are closed;
- lever means connecting said porous body and lever;
- and means for supporting said porous body in an out-of-doors position exposed to rainfall, whereby said porous body is depressed when sufficient rain falls thereon to open said contacts for deactivating said power supply circuit;
- said push-button switch having normally open other contacts arranged to be closed when the first-named contacts are open and vice versa;
- an alarm device connected in another circuit with said other contacts and said power supply, whereby said alarm device will be actuated when said porous body is depressed by rain or snow to open the first-named contacts and colse said other contacts.

7. A control apparatus for a lawn sprinkling system including a solenoid-controlled water valve in a power supply circuit with a clock-controlled switch and an electric power source, comprising in combination:
- a box having a rectangular base with open top and a removable cover on said base;
- a partition in said box dividing the same into two compartments;
- a sponge simulating in density and porosity equivalent characteristics of said lawn;
- a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;
- a removable screen mounted on the base over said one compartment to prevent foreign objects from falling in the box;
- means on said box for mounting the same in a horizontal position so that the sponge is exposed to said rainfall;
- a push-button switch in the other compartment, said push-button switch having normally closed contacts for connection in said circuit;
- a lever pivotally mounted on said push-button switch for opening said contacts;
- lever means connecting said bar to said lever, said partition having a vertical slot therein, said bar passing through said slot and constrained against lateral movement by edges of said slot;
- and spring means yieldably supporting said lever in an elevated position so that said contacts are closed, whereby said sponge is lowered when it is wet by sufficient rain falling thereon through the opening in the cover to open said contacts and thereby open said power supply circuit;
- said push-button switch having normally open other contacts arranged to be closed when the first-named contacts are open and vice versa;
- an alarm device connected in another circuit with said other contacts and said power supply whereby said alarm device will be actuated when said porous body is depressed by rain or snow to open the first-named contacts and close said other contacts.

8. A control apparatus for a lawn sprinkling system including a solenoid-controlled water valve in a power supply circuit with a clock-controlled switch and an electric power source, comprising in combination:
- a box having a rectangular base with open top and a removable cover on said base;
- a partition in said box dividing the same into two compartments;
- a sponge simulating in density and porosity equivalent characteristics of said lawn;
- a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;
- a push-button switch in the other compartment, said push-button switch having normally closed contacts for connection in said circuit;
- a lever pivotally mounted on said push-button switch for opening said contacts;
- lever means connecting said bar to said lever, said partition having a vertical slot therein, said bar passing through said slot and constrained against lateral movement by edges of said slot;
- and spring means yieldably supporting said lever in an elevated position so that said contacts are closed, whereby said sponge is lowered when it is wet by sufficient rain falling thereon through the opening in the cover to open said contacts and thereby open said power supply circuit;
- said power supply circuit having switch means for deactivating said solenoid controlled valve independent of said push-button switch;
- said push-button switch having normally open other contacts for connection to an alarm device, said other contacts being arranged to be closed when the first-named contacts are open, whereby said alarm device will be actuated when said porous body is depressed by rain or snow to close said other contacts.

9. A control apparatus for a lawn sprinkling system including a solenoid-controlled water valve in a power supply circuit with a clock-controlled switch and an electric power source, comprising in combination:
- a box having a rectangular base with open top and a removable cover on said base;
- a partition in said box dividing the same into two compartments;
- a sponge simulating in density and porosity equivalent characteristics of said lawn;
- a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;
- a push-button switch in the other compartment, said push-buttom switch having normally closed contacts for connection in said circuit;
- a lever pivotally mounted on said push-button switch for opening said contacts;
- lever means connecting said bar to said lever, said partition having a vertical slot therein, said bar passing through said slot and constrained against lateral movement by edges of said slot;
- spring means yieldably supporting said lever in an elevated position so that said contacts are closed, whereby said sponge is lowered when it is wet by sufficient rain falling thereon through the opening in the cover to open said contacts and thereby open said power supply circuit;
- the lever means connecting said bar to said lever including a sleeve telescopically receiving said bar so that the leverage exerted by said sponge on said spring means is adjustable;

and means on said box for mounting the same in a horizontal position in an out-of-doors location so that the sponge is exposed to rain and snow all year round.

10. A control apparatus for a lawn sprinkling system including a solenoid-controlled water valve in a power supply circuit with a clock-controlled switch and an electric power source, comprising in combination:
- a box having a rectangular base with open top and a removable cover on said base;
- a partition in said box dividing the same into two compartments;
- a sponge simulating in density and porosity equivalent characteristics of said lawn;
- a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;
- a push-button switch in the other compartment, said push-button switch having normally closed contacts for connection in said circuit;
- a lever pivotally mounted on said push-button switch for opening said contacts;
- lever means connecting said bar to said lever, said partition having a vertical slot therein, said bar passing through said slot and constrained against lateral movement by edges of said slot;
- spring means yieldably supporting said lever in an elevated position so that said contacts are closed, whereby said sponge is lowered when it is wet by sufficient rain falling thereon through the opening in the cover to open said contacts and thereby open said power supply circuit;
- the lever means connecting said bar to said lever including a sleeve telescopically receiving said bar so that the leverage exerted by said sponge on said spring means is adjustable;
- and means on said box for mounting the same in a horizontal position in an out-of-doors location so that the sponge is exposed to rain and snow all year round;
- said push-button switch having normally open other contacts arranged to be closed when the first-named contacts are open and vice versa;
- an alarm device connected in another circuit with said other contacts and said power supply, whereby said alarm device will be actuated when said porous body is depressed by rain or snow to open the first-named contacts and close said other contacts.

11. A control apparatus for a lawn sprinkling system including a solenoid-controlled water valve in a power supply circuit with a clock-controlled switch and an electric power source, comprising in combination:
- a box having a rectangular base with open top and a removable cover on said base;
- a partition in said box dividing the same into two compartments;
- a sponge simulating in density and porosity equivalent characteristics of said lawn;
- a bar supporting said sponge in one of said compartments, said top having an opening therein over said one compartment to admit rainfall, said base having another opening in its bottom in said one compartment to drain excess rainfall out of the box, said bar supporting the sponge in the one compartment between said openings;
- a push-button switch in the other compartment, said push-button switch having normally closed contacts for connection in said circuit;
- a lever pivotally mounted on said push-button switch for opening said contacts;
- lever means connecting said bar to said lever, said partition having a vertical slot therein, said bar passing through said slot and constrained against lateral movement by edges of said slot;
- spring means yieldably supporting said lever in an elevated position so that said contacts are closed, whereby said sponge is lowered when it is wet by sufficient rain falling therein through the opening in the cover to open said contacts and thereby open said power supply circuit;
- the lever means connecting said bar to said lever including a sleeve telescopically receiving said bar so that the leverage exerted by said sponge on said spring means is adjustable;
- and means on said box for mounting the same in a horizontal position in an out-of-doors location so that the sponge is exposed to rain and snow all year round;
- said push-button switch having normally open other contacts for connection to an alarm device, said other contacts being arranged to be closed when the first-named contacts are open and vice versa, whereby said alarm device will be actuated when said porous body is depressed to open the first-named contacts and close said other contacts.

References Cited by the Examiner

UNITED STATES PATENTS

| | | | |
|---|---|---|---|
| 889,928 | 6/08 | Hogan | 239—72 |
| 1,992,877 | 2/35 | Monthan | 239—65 |
| 2,527,119 | 10/50 | Dauber et al. | 239—71 |
| 2,577,337 | 12/51 | Lancaster | 239—65 |
| 2,776,860 | 1/57 | Griffis | 239—65 |
| 2,991,938 | 7/61 | Norcross | 239—69 |
| 2,969,186 | 1/61 | Geiger | 239—65 |

EVERETT W. KIRBY, *Primary Examiner.*